United States Patent [19]
Yamazaki et al.

[11] Patent Number: 5,457,510
[45] Date of Patent: Oct. 10, 1995

[54] CAMERA FOR CONTROLLING A FILM USE STATUS INDICATOR WHEN REWINDING A PARTIALLY-USED FILM CARTRIDGE

[75] Inventors: Youichi Yamazaki, Kawasaki; Kazuyuki Kazami, Tokyo; Norikazu Yokonuma, Yokohama; Hideo Hibino, Kawasaki, all of Japan

[73] Assignee: Nikon Corporation, Tokyo, Japan

[21] Appl. No.: 207,617

[22] Filed: Mar. 9, 1994

[30] Foreign Application Priority Data

Mar. 11, 1993  [JP]  Japan ................................. 5-051059

[51] Int. Cl.$^6$ ................................. G03B 1/00; G03B 7/00
[52] U.S. Cl. .......................... 354/21; 354/214; 354/289.1
[58] Field of Search ................................. 354/21, 289.1, 354/275, 214

[56] References Cited

U.S. PATENT DOCUMENTS 4,866,467  9/1989  Taniguchi et al. ........................ 354/21

FOREIGN PATENT DOCUMENTS

4-76526  3/1992  Japan .

Primary Examiner—Michael L. Gellner
Assistant Examiner—J. K. Han
Attorney, Agent, or Firm—Oliff & Berridge

[57] ABSTRACT

A camera according to the present invention comprises: an indicator driving device which drives an indicator of a film cartridge so that the indicator indicates either a film-usable status or a film-unusable status; a film-feeding device; a discriminating function for discriminating whether the sensitivity of the loaded film is equal to that set for exposure calculation so as to output a matching signal when the former sensitivity is equal to the latter and to output a mismatching signal when the former differs from the latter; an instructing function for giving an instruction to rewind a partially-used film; and a control function for, at least on condition that the instruction is given, rewinding the film by the film-feeding device. The control function also controls the indicator driving device so that the indicator indicates the film-usable status when the matching signal is output and so that the indicator indicates the film-unusable status when the mismatching signal is output.

14 Claims, 6 Drawing Sheets

CAMERA FOR CONTROLLING A FILM USE STATUS INDICATOR WHEN REWINDING A PARTIALLY-USED FILM CARTRIDGE

BACKGROUND OF THE INVENTION

1. Field of the Invention

The present invention relates to a camera in which a film-use status can be indicated by actuating an indicating mechanism provided for a film cartridge.

2. Description of the Related Art

A film cartridge provided with an indicating mechanism for indicating the film-use status of a roll of film accommodated in the cartridge has been proposed. Such an indicating mechanism indicates whether the film is totally unused, i.e. no frames are exposed at all (hereinafter referred to as "unused film"), or the film is removed while not all the frames are exposed, i.e., one or more frames are exposed and the film is then removed without exposing the rest of the frames (hereinafter referred to as "partially-used film"), or the film is completely used, i.e., all the frames are exposed (hereinafter referred to as "completely-used film"). The partially-used film can be loaded again in the camera, thereby enabling the exposure on the unexposed frames.

A camera for photographing by employing the cartridge provided with the above indicating mechanism is disclosed in U.S. patent application Ser. No. 07/728,208 (filed on Jul. 10, 1991) and U.S. patent application Ser. No. 08/112,479 (filed on Aug. 27, 1993) by the present inventor. Such a camera recognizes the actual film-use status and actuates, according to the results of the recognition, the indicating mechanism of the cartridge so as to indicate the suitable film-use status. Hence, a camera user can confirm the film-use status simply by observing the indicating mechanism of the cartridge removed from the camera. As a result, it is possible to prevent inconveniences, for example, a cartridge accommodating a completely-used film is mistakingly loaded again in the camera, or a partially-used film is mistakingly developed.

In general, when a film cartridge is loaded in the camera, film ISO sensitivity is read from a DX code provided for the cartridge and the resultant ISO sensitivity is automatically set as a parameter for calculating an exposure value. In some cases, however, the set ISO sensitivity is intentionally changed. That is, the sensitivity different from the actual film sensitivity is set and photography is then performed sometimes. In such a case, since the exposure value for photography is calculated on the basis of the changed sensitivity, a typical developing treatment cannot obtain appropriately-exposed pictures. However, if an adjustment is made to the exposure for developing according to the change in the ISO sensitivity, appropriately-exposed pictures can be obtained. Nevertheless, a mixture of frames exposed under the different setting of the sensitivity in one roll of film gets behind in the developing operation, and consequently, once the ISO sensitivity is changed when an unused film is loaded in the camera, it is necessary to perform photography while conforming to the set ISO sensitivity throughout.

However, when a film in which a few frames are exposed after changing the ISO sensitivity is removed and loaded again in the camera, frames exposed under the different setting of the sensitivity might be mixed in one roll of film if a photographer forgets that he/she has changed the sensitivity or another photographer who is not aware of the change of the sensitivity uses the film.

SUMMARY OF THE INVENTION

Accordingly, an object of the present invention is to provide a camera employing a cartridge which is capable of indicating the film-use status so as to avoid a mixture of frames exposed under the different setting of sensitivity in one roll of film.

In order to achieve the above object, the present invention provides a camera employing a cartridge indicating a film-use status, comprising: an indicator driving device which drives an indicator of a film cartridge loaded in said camera so that said indicator indicates any one of film-usable and film-unusable status; a film-feeding device which advances a film from said cartridge and rewinds a film into said cartridge; discriminating means for discriminating whether or not sensitivity of the film of the loaded cartridge is substantially equal to sensitivity set for exposure calculation so as to output a matching signal if both the sensitivities are substantially equal to each other and to output a mismatching signal if both the sensitivities are not substantially equal to each other; rewind instructing means for giving an instruction to rewind a partially-used film being partially pulled out from said cartridge; and control means for, at least on condition that said instruction is given to rewind a partially-used film, actuating said film-feeding device so as to rewind said partially-used film and controlling said indicator driving device so that said indicator of said cartridge indicates said film-usable status when said matching signal is output and so that said indicator indicates said film-unusable status when said mismatching signal is output.

According to the present invention, if an instruction is given to rewind a partially-used film when the sensitivity of the loaded film differs from that set for calculating the exposure, the film is rewound. In such a case, even if the film is only partially used, the indicating means of the cartridge indicates the film unusable status. As a result, after the cartridge is removed from the camera, it cannot be reloaded therein. Therefore a mixture of frames exposed under the different setting of the sensitivity in one film can be avoided, then, developing operation of the film can be performed smoothly.

DESCRIPTION OF THE PREFERRED EMBODIMENTS

An embodiment of the present invention will now be described with reference to FIGS. 1A–5.

Figure 1A:
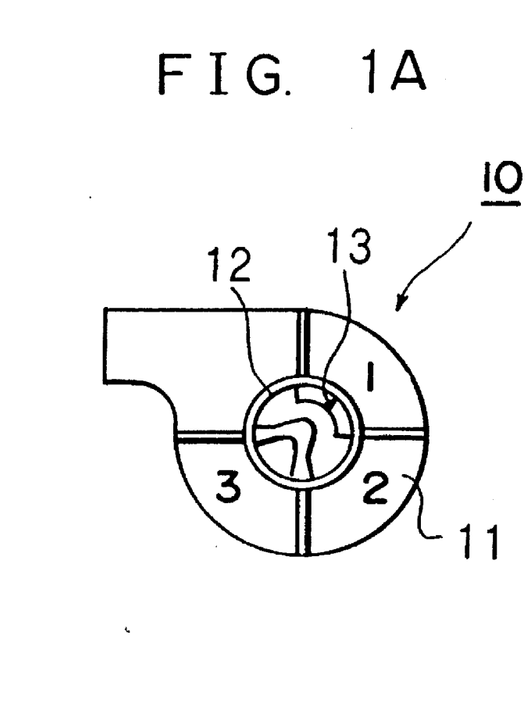
FIGS. 1A–1C are top views of a film cartridge used in an embodiment of the present invention.
Figure 1B:
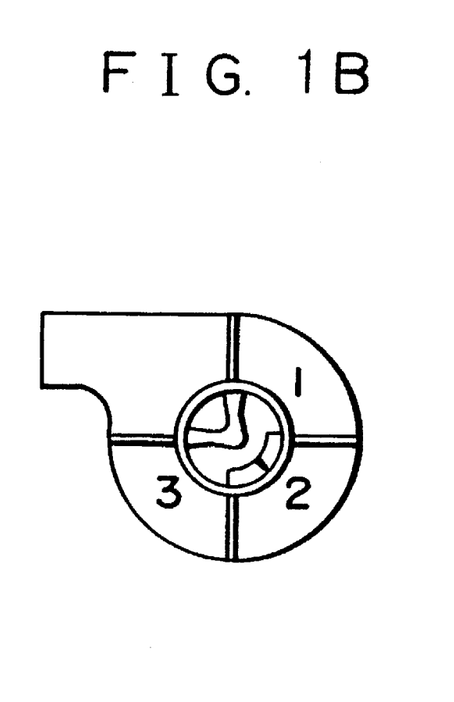
Figure 1C:
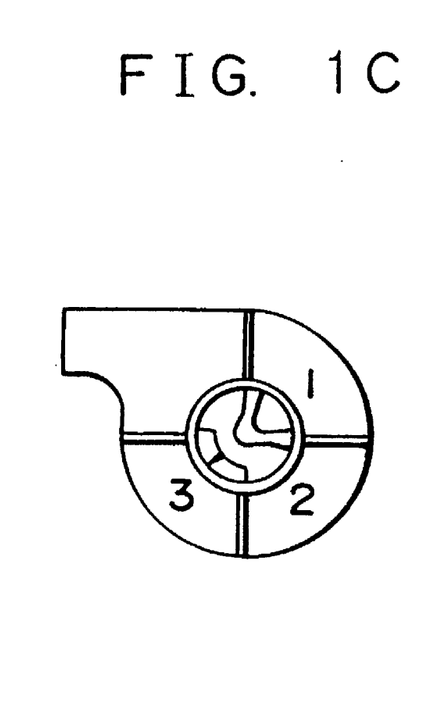

FIGS. 1A–1C are top views showing a cartridge used in this embodiment. As has been disclosed in, for example, U.S. patent application Ser. Nos. 728,208 and 112,479 by the present inventor, a mechanisms 11 for indicating a film-use status is provided for the top and bottom surfaces of a cartridge 10. The mechanism 11 indicates whether the film in the cartridge is unused film or partially-used film or completely-used film as described above.

Figure 2:
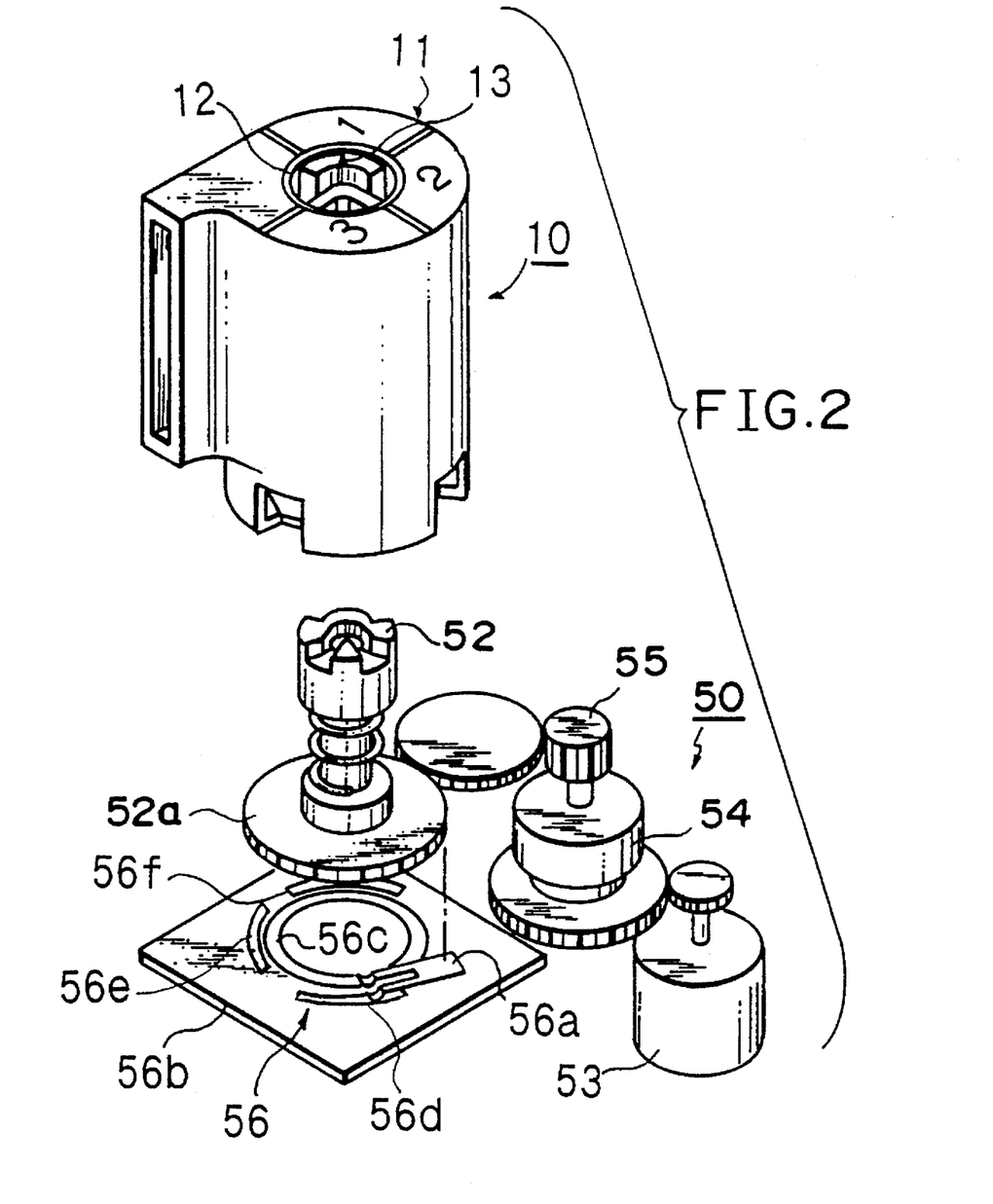
FIG. 2 shows a film feeding mechanism of a camera according to the present invention.

As shown in FIG. 2, the outer portions of the top and bottom surfaces of the cartridge 10 are each divided into 4 areas, three of which indicate the signs "1", "2" or "3" for showing the film-use status by means of printing, or the like. A spool 12 of the cartridge 10 for winding a film is provided with an indicator 13 rotated according to the rotation of the spool 12. The indicator 13 indicates the film-use status according to the position in which the rotation of the spool 12 is stopped. In this embodiment, the indicating sign "1" shows "unused film"; "2" shows "partially-used film; and "3" shows "completely-used film".

FIG. 2 shows the construction of a camera film feeding mechanism generally denoted by 50 and that of a fork encoder 56 for detecting the film-use status.

A fork denoted by 52 is engaged with the spool 12 of the cartridge 10 loaded in the camera and is provided with the rotation from a film feeding motor 53 via a reduction gear mechanism 55 including a clutch 54. The spool 12 is thus rotated integrally with the fork 52, thereby advancing and rewinding the film from/into the cartridge 10. The feeding motor 53 also provides the rotation for a take-up spool (not shown) via a gear train (not shown), thereby taking up the film fed from the cartridge 10 around the take-up stool. While the film is being taken up, the clutch 54 separates the fork 52 from the motor 53.

The fork encoder 56 comprises a brush 56a rotated integrally with a fork gear 52a, a common pattern 56c formed on a base plate 56b, and segment patterns 56d, 56e and 56f also formed on the base plate 56b. When the indicator 13 of the spool 12 indicates "1", "2", "3", the brush 56 contacts the segment patterns 56d, 56e, 56f, respectively.

Figure 3:
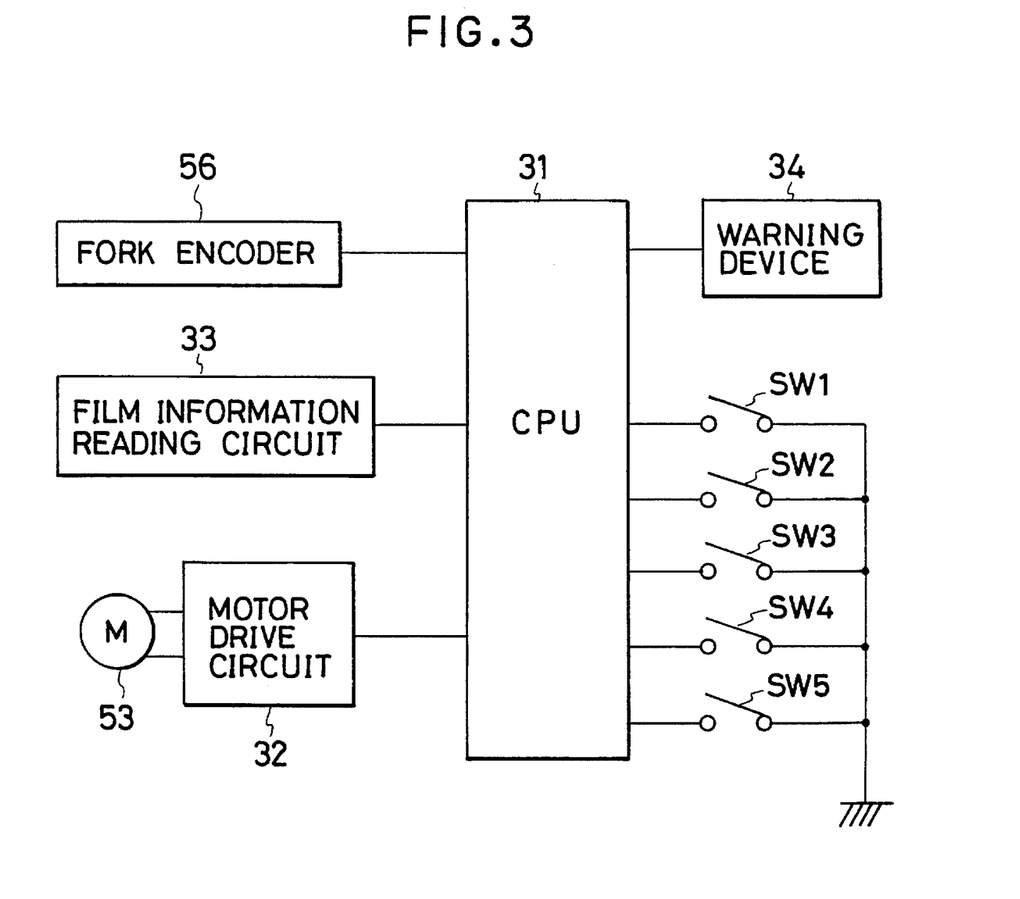
FIG. 3 is a block diagram showing a control system of the camera.

FIG. 3 shows the construction of a control system of the camera. Connected to the CPU 31 are the fork encoder 56, a motor drive circuit 32 of the film feeding motor 53, a film-information reading circuit 33, and a warning device 34. The film-information recording circuit 33 reads from the DX code (not shown) of the cartridge, film information such as ISO sensitivity and the number of frames of the film. The warning device 34 is arranged to give a warning when the ISO sensitivity read from the DX code and set as a sensitivity for calculating the exposure value is changed by a manual operation. It may emit a sound, for example, a buzzer sound, or it may display a warning, for example, on a liquid crystal display.

Connected to the CPU 31 are a sensitivity input switch SW1 for manually setting the ISO sensitivity, a first rewinding switch SW2 for rewinding the partially-used film, a release switch SW3 which is turned on operationally cooperating with the manipulation of a release button (not shown), and a second rewinding switch SW4. The second rewinding switch SW4 is operable for giving an instruction to perform the forced rewinding if the film has not been rewound only by the actuation of the first rewinding switch SW1 as described below.

In this embodiment, when the sensitivity input switch SW1 is not manipulated, the film sensitivity read by the film-information reading circuit 33 is set as the sensitivity for calculating the exposure value. On the other hand, when the sensitivity input switch SW1 is manipulated, the sensitivity input by the switch SW1 is given priority over the sensitivity read by the film-information reading circuit 33 and is set as the sensitivity for calculating the exposure value.

The control procedure of the CPU 31 will be explained with reference to flow charts in FIGS. 4 and 5.

The program is started when the film cartridge 10 is loaded in the camera. In FIG. 4, the film is fed by the film feeding mechanism 50 shown in FIG. 2 and the first frame of the film is disposed to face the aperture in the step S1. In the step S2, film information such as the ISO sensitivity, the number of frames read by the film-information reading circuit 33 is input and the read ISO sensitivity is set as the sensitivity for calculating the exposure value. In the step S3, it is discriminated whether the ISO sensitivity set in the step S2 has been changed, that is, whether an ISO sensitivity different from that read by the film-information reading circuit 33 has been set by manipulation of sensitivity input switch SW1.

When the sensitivity has not been changed, it is determined that the actual sensitivity of the loaded film is equal to the set sensitivity, and the program proceeds to the step S4 in which the flag F is set as "0" and the program further proceeds to the step S6. On the other hand, when the sensitivity has been changed, it is determined that the actual sensitivity of the loaded film differs from the set sensitivity, and the program proceeds to the step S5 in which the flag F is set as "1" and the program further proceeds to the step S6. In the step S6, it is discriminated whether the release switch SW3 is on or off. If it is on, a photographing operation is performed in the step S8. More specifically, the exposure value is calculated on the basis of the set sensitivity of the film (the sensitivity read from the DX code or the sensitivity changed by the manipulation of the sensitivity input switch SW1) and subject brightness obtained with a photometric circuit (not shown), and an aperture and a shutter are actuated on the basis of the calculated exposure value so as to expose a film. In the step 9, the film is rewound by one frame by the film feeding mechanism 50. In the step 10, it is discriminated whether the film has been wound to the end, that is, whether all the frames have been exposed. If the film has not been wound to the end, the program returns to the step S3 and the above process is repeated. If the film has been wound to the end, the program proceeds to the step S20 in FIG. 5.

In the step S20, the motor 53 is reversely rotated so as to rewind the film into the cartridge 10, and after the completion of rewinding the film, indication of the completely-used film (indication of the film-unusable status) is performed in the step S21. More specifically, the spool 12 continues to be rotated even after the completion of rewinding the film, and the motor 53 is stopped upon the detection of the brush 56a of the fork encoder 56 being brought into contact with the segment pattern 56f. Thus, the indicator 13 indicates "3" (completely-used film). When the cartridge 10 is removed in the step S14, the process is completed.

If it is determined that the release switch SW6 is off in the step S6, the program proceeds to the step S7 in which it is discriminated whether the first rewinding switch SW2 is on or off. If it is off, the program returns to the step S3 and the above process is repeated. If the first rewinding switch SW2 is on, in other words, if an instruction is given to rewind the partially-used film, the program proceeds to the step S11 in FIG. 5.

In the step S11, the state of the flag F is discriminated. If the flag is F=1, in other words, the first rewinding switch SW2 is on after the film sensitivity was changed, the program proceeds to the step S15 in which a warning is started by the warning device 34. Thereupon, the program loops in the steps S16 and S17 in which the manipulation of either the second rewinding switch SW4 or the release switch SW3 is waited. If it is determined that the second rewinding switch SW4 is on in the step S16, the warning is stopped in the step S19 and the process in the steps S20, S21 and S14 are performed. That is, the film is rewound and the indication of the completely-used film is performed even though one or more frames in the film are still unexposed.

Figure 4:
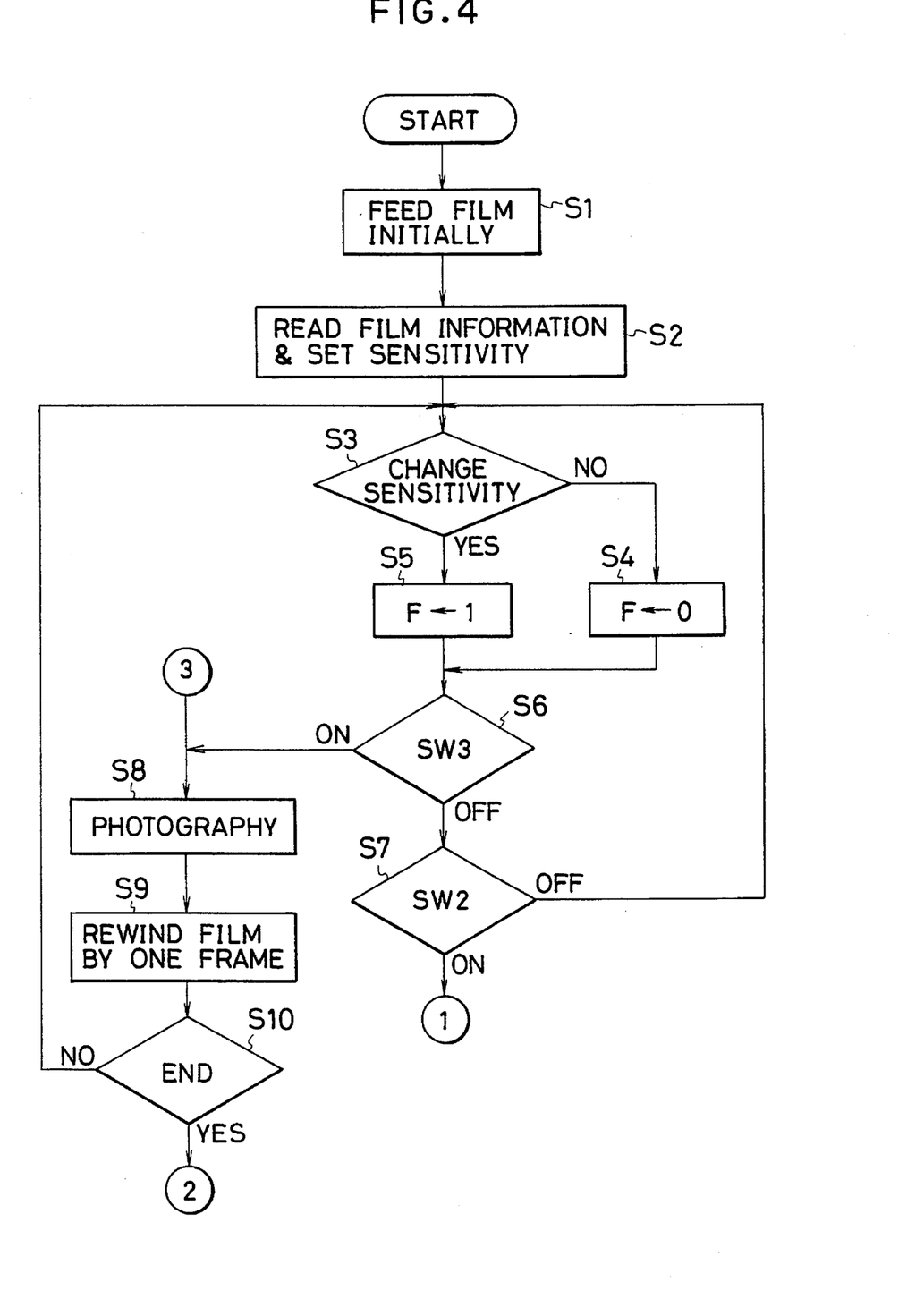
FIGS. 4 and 5 are flow charts for explaining the operation of the embodiment.
Figure 5:
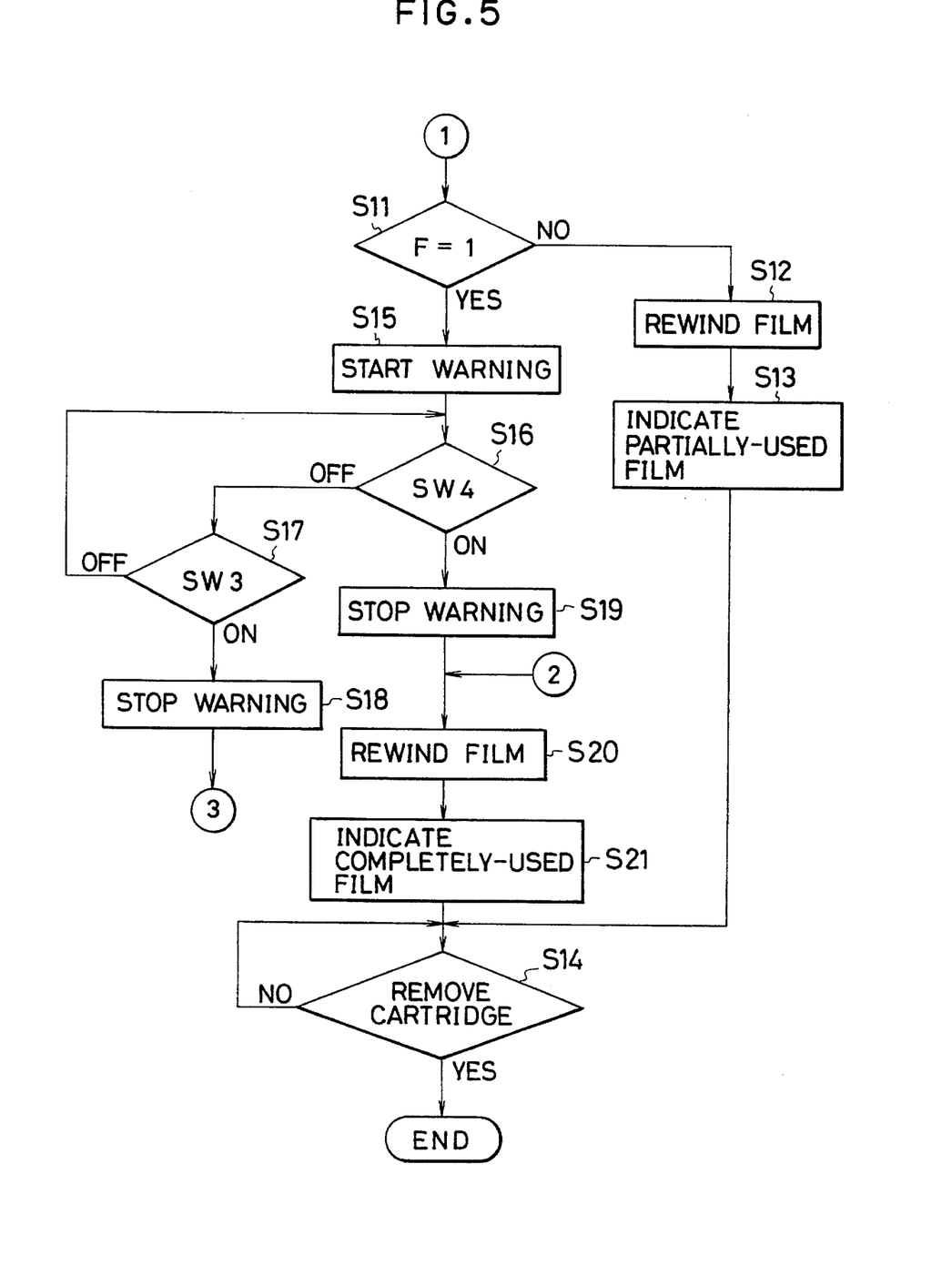

If the actuation of the release switch SW3 is determined in the step S17 when the program loops in the steps S16 and S17, the warning is stopped in the step S18 and the program proceeds to the step S8 in FIG. 4 and the above photographing operation is performed.

In the step S11, if F=0, in other words, if the first rewinding switch SW2 is on when the film sensitivity setting is not changed, the film is rewound into the cartridge 10 in the step S12 and after the completion of rewinding the film, indication of partially-used film (indication of the film-usable status) is performed in the step S13. More specifically, the spool 12 continues to be rotated even after the completion of rewinding the film, and the motor 53 is stopped upon the detection of the brush 56a of the fork encoder 56 being brought into contact with the segment pattern 56e. The indicator 13 thus indicates "2" (partially-used film). When the cartridge 10 is removed in the step S14, the process is completed.

According to the above procedure, if the film sensitivity is changed by the manipulation of the film sensitivity setting switch SW1, the film is not immediately rewound even though the first rewinding switch SW2 is on, and instead, a warning is given by means of a buzzer sound or a display. If a photographer manipulates the second rewinding switch SW4 in response to the warning, the film is rewound and the film-use status indicating mechanism 11 of the cartridge 10 indicates "completely-used film" even though one or more frames are still unexposed. Thus, the film can be prevented from being loaded again in the camera for photographing by the photographer, thereby further protecting the film from being exposed under the different setting of sensitivity.

If the photographer turns on the release switch SW3 instead of the second rewinding switch SW4 in response to the warning, the film is not rewound but a photographing operation is performed, then phototaking can be continued thereafter in the same film.

As described above, the warning urges a photographer, when the rewinding of the film is instructed after the setting of the sensitivity of the film is changed, to choose between rewinding the film, in which case part of the film will be wasted, and not rewinding the film and continuing to photographing with the same film. The process thereafter is left to the discretion of the photographer.

If the film sensitivity is not changed but the sensitivity read from the DX code is used as the sensitivity for calculating the exposure value, the film is rewound in response to the manipulation of the first rewinding switch SW2, and the indicating mechanism 11 of the cartridge 10 indicates "partially-used film". In such a case, the same cartridge can be reloaded in the camera and phototaking can be performed.

Another embodiment will now be described.

In the above embodiment, "completely-used film" is always indicated when the film is rewound leaving one or more frames unexposed in a state where the sensitivity setting is changed. In this embodiment, it is possible to indicate "partially-used film" even when the sensitivity setting is changed.

Figure 6:
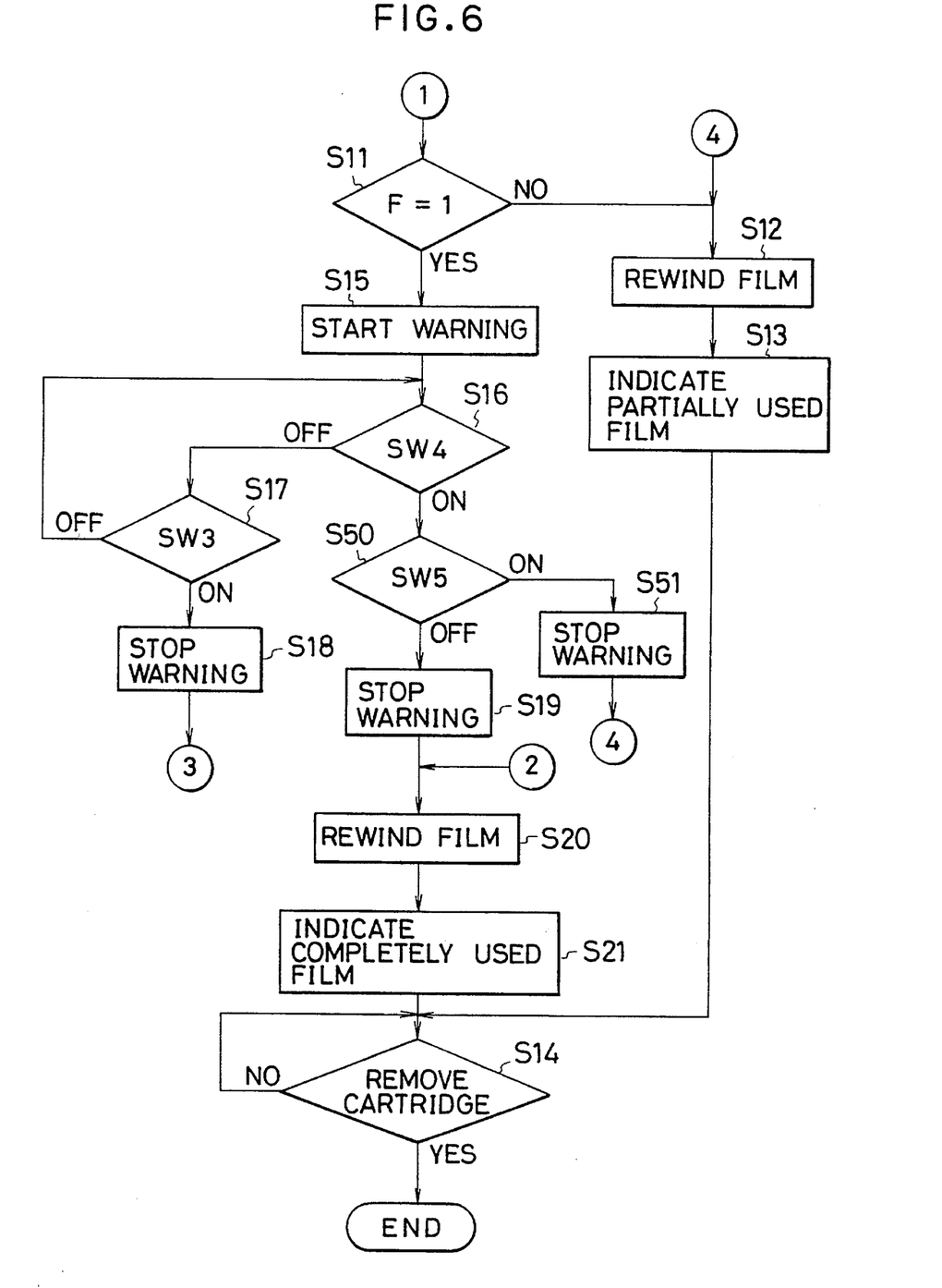
FIG. 6 is a flow chart for explaining the operation of another embodiment.

A switch SW5 in FIG. 3 is an indication-instructing switch for giving an instruction to indicate "partially-used film". FIG. 6 is a flow chart in which the steps S50 and S51 are added to that of FIG. 5. In this routine, when the manipulation of the second rewinding switch SW4 is determined in the step S16, whether the indication-instructing switch S5 is on or off is discriminated in the step S50. If the switch SW5 is off, the program proceeds to the step S19 onwards. If the switch SW5 is on, the warning is stopped in the step S51 and then the operation proceeds to the step S12.

According to the present embodiment, when the indication-instructing switch SW5 is on, "partially-used film" is indicated in response to the manipulation of the second rewinding switch SW4 after warning even though the film sensitivity is changed. Hence, the film can be reloaded in the camera and photographing can be performed, thus avoiding the waste of the film. In such a case, when the film is removed leaving one or more frames unexposed, a photographer has to remember that the sensitivity setting of the film has been changed and to change the sensitivity again by the manipulation of the sensitivity input switch SW1 when the film is reloaded in the camera, thereby avoiding a mixture of the frames exposed under the different setting of sensitivity in one film.

The present invention may be modified such that the second rewinding switch SW4 is omitted and the rewinding after warning is started by the manipulation of the first rewinding switch SW2. In the above embodiments, although when the first rewinding switch SW2 is manipulated to rewind a partially-used film in photographed after the sensitivity setting is changed, a warning is given so that a photographer can choose at his/her discretion between rewinding the film and continuing to photography, the film may be rewound immediately in response to the first rewinding switch SW2 and "completely-used film" may be indicated. It is also desirable but not essential to give a warning in this case. The construction of the film-use status indicating mechanism of the cartridge and that of the indicator driving mechanism of the camera are not limited to those in the above embodiments. For example, although it is possible to indicate the three kinds of indicates such as "unused film", "partially-used film" and "completely-used film" in the above embodiments, only the indication of "usable film" and "unusable film" is essential. Further, since the indicating mechanism in the above embodiments switches among the indication status in accordance with the position when rotation of the spool of the cartridge is stopped, the film-use status is always indicated after the film is rewound. However, if the indicating mechanism indicates the film-use status regardless of the position of the spool of the cartridge, the film-use status may be indicated before the film is rewound. Moreover, although film information including the film sensitivity is read from the DX code of the cartridge in the above embodiments, film information recorded on, for example, a magnetic recording area of the film in advance may be read by a magnetic head.

We claim:

1. A camera employing a film cartridge having an indicator for indicating at least one of a film-usable and a film-unusable status, comprising:

an indicator driving device for driving the indicator of a film cartridge loaded in the camera;

a film-feeding device for advancing a film from the film cartridge and for rewinding the film back into the film cartridge;

a reading device for reading a film sensitivity from one of the film cartridge and the film;

a sensitivity input device for manually inputting a film sensitivity;

a signal output device for outputting a matching signal when the film sensitivity input by said sensitivity input device matches the film sensitivity read by said reading device, and for outputting a mismatching signal when the film sensitivity input by said sensitivity input device does not match the film sensitivity read by said reading device;

a rewind instruction input device for inputting an instruction to rewind the film cartridge; and a controller for controlling said indicator driving device so that the indicator of a partially-used film cartridge indicates the film-usable status when the partially-used film cartridge is rewound and the matching signal is output from said signal output device, and for controlling said indicator driving device so that the indicator of the partially-used film cartridge indicates the film-unusable status when the partially-used film cartridge is rewound and the mismatching signal is output from said signal output device.

2. A camera according to claim 1, further comprising a sensitivity setting device for setting a film sensitivity for exposure calculation, said sensitivity setting device setting the film sensitivity to a manually input film sensitivity when a film sensitivity is input by said sensitivity input device, said sensitivity setting device setting the film sensitivity to a read film sensitivity when no film sensitivity is input by said sensitivity input device.

3. A camera according to claim 1, further comprising a warning device for outputting a warning signal, and wherein said controller comprises warning actuation means for actuating said warning device when a mismatching signal is output from said signal output device, said warning device is not already actuated, and a rewind instruction to rewind a partially-used film cartridge is input by said rewind instruction input device.

4. A camera according to claim 3, wherein said controller further comprises rewind actuation means for actuating said film-feeding device to rewind the partially-used film cartridge and for controlling said indicator driving device so that the indicator of the partially-used film cartridge indicates the film-unusable status when a rewind instruction is input by said rewind instruction input device while said warning device is actuated.

5. A camera according to claim 4, wherein said controller further comprises rewind prevention means for preventing actuation of said film-feeding device and said indicator driving device until a rewind instruction to rewind the partially-used film cartridge is input by said rewind instruction input device while said warning device is actuated.

6. A camera according to claim 5, wherein said controller further comprises deactivation means for deactivating said warning device and for allowing a phototaking operation to occur when a release operation is performed while said warning device is actuated.

7. A camera employing a film cartridge having an indicator for indicating at least one of a film-usable and a film-unusable status, comprising:

an indicator driving device for driving the indicator of a film cartridge loaded in the camera;

a film-feeding device for advancing a film from the film cartridge and for rewinding the film back into the film cartridge;

a reading device for reading a film sensitivity from one of the film cartridge and the film;

a sensitivity input device for manually inputting a film sensitivity;

a signal output device for outputting a matching signal when the film sensitivity input by said sensitivity input device matches the film sensitivity read by said reading device, and for outputting a mismatching signal when the film sensitivity input by said sensitivity input device does not match the film sensitivity read by said reading device;

a rewind instruction input device for inputting an instruction to rewind the film cartridge;

an indication-instruction input device for inputting an instruction to indicate the film-usable status; and a controller, said controller comprising:

first indicator control means for controlling said indicator driving device so that the indicator of a partially-used film cartridge indicates the film-usable status when the partially-used film cartridge is rewound and the matching signal is output from said signal output device, second indicator control means for controlling said indicator driving device so that the indicator of a partially-used film cartridge indicates the film-usable status when the partially-used film cartridge is rewound, the mismatching signal is output from said signal output device, and an instruction to indicate the film-usable status has been input by said indication-instruction input device, and third indicator control means for controlling said indicator driving device so that the indicator of a partially-used film cartridge indicates the film-unusable status when the partially-used film cartridge is rewound, the mismatching signal is output from said signal output device, and no instruction to indicate the film-usable status has been input by said indication-instruction input device.

8. A camera according to claim 7, further comprising a sensitivity setting device for setting a film sensitivity for exposure calculation, said sensitivity setting device setting the film sensitivity to a manually input film sensitivity when a film sensitivity is input by said sensitivity input device, said sensitivity setting device setting the film sensitivity to a read film sensitivity when no film sensitivity is input by said sensitivity input device.

9. A camera according to claim 7, further comprising a warning device for outputting a warning signal, and wherein said controller further comprises:

warning actuation means for actuating said warning device when the mismatching signal is output from said signal output device and a rewind instruction to rewind a partially-used film cartridge is input by said rewind instruction input device; and rewind actuation means for actuating said film-feeding device to rewind a partially-used film cartridge and for controlling said indicator driving device so that the indicator of the partially-used film cartridge indicates the film-usable status when a rewind instruction is input by said rewind instruction input device, said warning device is actuated, and an instruction to indicate the film-usable status has been input by said indication-instruction input device.

10. A camera employing a film cartridge having an indicator for indicating at least one of a film-usable and a film-unusable status, comprising:

an indicator driving device for driving the indicator of a film cartridge loaded in the camera;

a film-feeding device for advancing a film from the film cartridge and for rewinding the film back into the film cartridge;

a reading device for reading a film sensitivity from one of the film cartridge and the film;

a sensitivity input device for manually inputting a film sensitivity;

a signal output device for outputting a matching signal when the film sensitivity input by said sensitivity input device matches the film sensitivity read by said reading device, and for outputting a mismatching signal when the film sensitivity input by said sensitivity input device does not match the film sensitivity read by said reading device;

a rewind instruction input device for inputting an instruction to rewind the film cartridge;

a warning device for outputting a warning signal; and a controller, said controller comprising:

> warning actuation means for actuating said warning device when the mismatching signal is output from said signal output device and a rewind instruction to rewind a partially-used film cartridge is input by said rewind instruction input device,
>
> first rewind actuation means for actuating said film-feeding device to rewind a partially-used film cartridge and for controlling said indicator driving device so that the indicator of the partially-used film cartridge indicates the film-usable status when a rewind instruction is input by said rewind instruction input device and the matching signal is output by said signal output device,
>
> second rewind actuation means for actuating said film-feeding device to rewind a partially-used film cartridge and for controlling said indicator driving device so that the indicator of the partially-used film cartridge indicates the film-unusable status when a rewind instruction is input by said rewind instruction input device while said warning device is actuated, and
>
> deactivation means for deactivating said warning device and for allowing a phototaking operation to occur when a release operation is performed while said warning device is actuated.

11. A camera according to claim 10, further comprising a sensitivity setting device for setting a film sensitivity for exposure calculation, said sensitivity setting device setting the film sensitivity to a manually input film sensitivity when a film sensitivity is input by said sensitivity input device, said sensitivity setting device setting the film sensitivity to a read film sensitivity when no film sensitivity is input by said sensitivity input device.

12. A camera according to claim 10, further comprising:

an indication-instruction input device for inputting an instruction to indicate the film-usable status, and wherein said controller further comprises third rewind actuation means for actuating said film-feeding device to rewind a partially-used film cartridge and for controlling said indicator driving device so that the indicator of the partially-used film cartridge indicates the film-usable status when a rewind instruction is input by said rewind instruction input device while said warning device is actuated, the mismatching signal is output from said signal output device, and an instruction to indicate the film-usable status has been input by said indication-instruction input device.

13. A method for providing an operator of a camera with a warning, comprising the steps of:

reading a film sensitivity from one of a film cartridge mounted in the camera and a film contained in the film cartridge;

setting a film sensitivity manually;

determining whether the read film sensitivity matches the manually set film sensitivity; and, issuing a warning when the read film sensitivity does not match the manually set film sensitivity and an instruction is given to rewind a partially-used film cartridge.

14. A method according to claim 13, wherein a film cartridge mounted in the camera has an indicator for indicating one of a film-usable and a film-unusable status, the method further comprising the steps of:

setting the indicator of the film cartridge to indicate the film-usable status when the partially-used film cartridge is rewound and the read film sensitivity matches the manually input film sensitivity; and setting the indicator of the film cartridge to indicate the film-unusable status when the partially-used film cartridge is rewound and the read film sensitivity does not match the manually input film sensitivity.

\* \* \* \* \*